United States Patent
O'Connor et al.

(10) Patent No.: US 11,629,821 B1
(45) Date of Patent: Apr. 18, 2023

(54) GAS DOSING APPARATUS WITH DIRECTIONAL CONTROL VALVE

(71) Applicants: Laurie M. O'Connor, East Aurora, NY (US); Paul K. Oetinger, Gasport, NY (US)

(72) Inventors: Laurie M. O'Connor, East Aurora, NY (US); Paul K. Oetinger, Gasport, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 17/578,831

(22) Filed: Jan. 19, 2022

(51) Int. Cl.
| | |
|---|---|
| B65D 83/54 | (2006.01) |
| A61M 16/12 | (2006.01) |
| F17C 13/04 | (2006.01) |
| F17C 7/00 | (2006.01) |

(52) U.S. Cl.
CPC ............... *F17C 13/04* (2013.01); *F17C 7/00* (2013.01); *F17C 2201/0104* (2013.01); *F17C 2205/0329* (2013.01); *F17C 2205/0338* (2013.01)

(58) Field of Classification Search
CPC ............ F17C 7/00; F17C 2205/0338
See application file for complete search history.

(56) References Cited

U.S. PATENT DOCUMENTS

| | | | | |
|---|---|---|---|---|
| 3,536,110 A | * | 10/1970 | West ................. | G07F 13/02 141/181 |
| 3,643,677 A | * | 2/1972 | Begleiter ............ | B64B 1/62 137/113 |
| 4,521,139 A | | 6/1985 | Kretschmer et al. | |
| 5,564,306 A | | 10/1996 | Miller | |
| 5,603,360 A | * | 2/1997 | Teel ................. | F17C 9/00 137/267 |
| 5,664,563 A | | 9/1997 | Schroeder et al. | |
| 5,916,245 A | * | 6/1999 | Tom .................. | B01D 53/0407 96/108 |
| 5,992,478 A | * | 11/1999 | Micke ............... | B01F 35/2213 141/105 |
| 6,131,572 A | | 10/2000 | Heinonen | |
| 6,135,170 A | * | 10/2000 | Lee .................. | F17C 5/06 141/196 |

(Continued)

FOREIGN PATENT DOCUMENTS

| | | |
|---|---|---|
| DE | 202012104535 U1 | 3/2013 |
| DE | 102015106678 B4 | 12/2018 |
| EP | 0163110 A2 | 12/1985 |

OTHER PUBLICATIONS

WO 0183084 A1—Original; Tom Glenn M, McManus James V; Nov. 8, 2001.*

*Primary Examiner* — Paul J Gray
(74) *Attorney, Agent, or Firm* — Robert J. Hampsch

(57) ABSTRACT

A gas dosing apparatus is provided that includes an inlet configured to receive gas, and a directional control valve connected to the inlet and having a first position and a second position. The gas dosing apparatus also includes a fixed volume reservoir connected to the directional control valve and receiving gas from the inlet, via the directional control valve, while the directional control valve is in the first position. The gas dosing apparatus further includes an outlet connected to the directional control valve and outputting a gas dose received from the fixed volume reservoir, via the directional control valve, while the directional control valve is in the second position.

6 Claims, 2 Drawing Sheets

(56) References Cited

U.S. PATENT DOCUMENTS

| | | | |
|---|---|---|---|
| 6,199,385 B1 * | 3/2001 | Driehuys | A61K 49/1815 |
| | | | 62/925 |
| 6,260,568 B1 * | 7/2001 | Hsu | F17C 13/045 |
| | | | 137/12 |
| 7,100,800 B2 | 9/2006 | Yakasovic Saavedra et al. | |
| 7,461,549 B1 | 12/2008 | Ding et al. | |
| 7,829,353 B2 | 11/2010 | Shajii et al. | |
| 8,418,545 B2 | 4/2013 | Sezeur et al. | |
| 9,058,041 B2 | 6/2015 | Lacouture et al. | |
| 9,119,977 B2 | 9/2015 | Rittner et al. | |
| 9,743,660 B2 | 8/2017 | Ilyin et al. | |
| 10,002,747 B2 | 6/2018 | Shareef et al. | |
| 10,023,454 B2 * | 7/2018 | Naot | B67C 3/28 |
| 10,412,957 B2 | 9/2019 | Ilyin et al. | |
| 2010/0009334 A1 | 1/2010 | Ilyin et al. | |
| 2010/0051109 A1 * | 3/2010 | Meier | F17C 13/045 |
| | | | 137/1 |
| 2013/0157249 A1 | 6/2013 | Ilyin et al. | |
| 2013/0344596 A1 | 12/2013 | Grieshober, Jr. et al. | |
| 2014/0154666 A1 | 6/2014 | Ilyin et al. | |
| 2014/0227678 A1 | 8/2014 | Ilyin et al. | |
| 2015/0305324 A1 | 10/2015 | Ilyin et al. | |
| 2018/0249703 A1 | 9/2018 | Ilyin | |
| 2021/0372565 A1 * | 12/2021 | Beuneken | F17C 13/025 |

\* cited by examiner

GAS DOSING APPARATUS WITH DIRECTIONAL CONTROL VALVE

TECHNICAL FIELD

The present disclosure relates generally to a gas dosing apparatus, and more particularly, to an apparatus that provides volume-controlled gas dosing using a directional control valve.

BACKGROUND

Recently developed blood platelet collection processes such as those described in U.S. Pat. Nos. 9,743,660 and 10,412,957 as well as United States Patent Application Publication No. 2018/249703, the collected blood platelets are required to be stored in a platelet collection bag that is placed inside a barrier film bag to extend the shelf life of the platelets. The internal space existing between the blood platelet collection bag and the barrier film bag is filled with a xenon and oxygen gas mixture (e.g. 87% Xe/13% $O_2$ mixture). This dosed gaseous volume must be controlled and consistent to prevent overfilling or underfilling. Overfilling may result in bursting of the barrier film bag, while underfilling may reduce the effectiveness of the gas mixture surrounding the platelet collection bag.

An apparatus used for proper dosing of the mixture to the barrier film bag is disposed between a gas cylinder and the barrier film bag. Therefore, an inlet connection of the dosing apparatus must be compatible with an outlet of the gas cylinder providing the gas mixture, and an outlet connection of the dosing apparatus must be compatible with a unique or proprietary inlet connection on the barrier film bag.

When used as part of a dosing apparatus, a gas flow meter with a totalizer measures a flow volume of gas through a tube but requires a control system and a power source to automatically provide a consistent dosing. Thus, the inclusion of the gas flow meter in the dosing apparatus also increases an overall cost of the dosing apparatus. Similarly, a metering pump may connect to a gas source for automatic gas dosing but may also require a power source.

SUMMARY

According to one embodiment, a gas dosing apparatus is provided that includes an inlet configured to receive gas, and a directional control valve connected to the inlet and having a first position and a second position. The gas dosing apparatus also includes a fixed volume reservoir connected to the directional control valve and receiving gas from the inlet, via the directional control valve, while the directional control valve is in the first position. The gas dosing apparatus further includes an outlet connected to the directional control valve and outputting a gas dose received from the fixed volume reservoir, via the directional control valve, while the directional control valve is in the second position.

According to one embodiment, a gas dosing system is provided that includes a compressed gas cylinder and a valve integrated pressure regulator (VIPR) connected to the compressed gas cylinder and providing gas at a consistent pressure from the compressed gas cylinder. The gas dosing system also includes a directional control valve having a first position and a second position. The gas dosing system additionally includes a fixed volume reservoir connected to the directional control valve and receiving gas from the VIPR, via the directional control valve, while the directional control valve is in the first position. The gas dosing system further includes a barrier film bag receiving a gas dose from the fixed volume reservoir, via the directional control valve, while the directional control valve is in the second position.

According to one embodiment, a method is provided for operating a gas dosing apparatus. An inlet of the gas dosing apparatus is connected to a VIPR of a gas cylinder. An outlet of the gas dosing apparatus is connected to a barrier film bag. A button is depressed closing a directional control valve of the gas dosing apparatus and allowing gas flow from the VIPR to a fixed volume reservoir of the gas dosing apparatus, via the directional control valve, at a consistent pressure. The button is released opening the directional control valve and transferring a gas dose from the fixed volume reservoir to the barrier film bag, via the directional control valve.

BRIEF DESCRIPTION OF THE DRAWINGS

The above and other aspects, features, and advantages of certain embodiments of the present disclosure will be more apparent from the following detailed description, when taken in conjunction with the accompanying drawings, in which.

DETAILED DESCRIPTION

Figure 1:
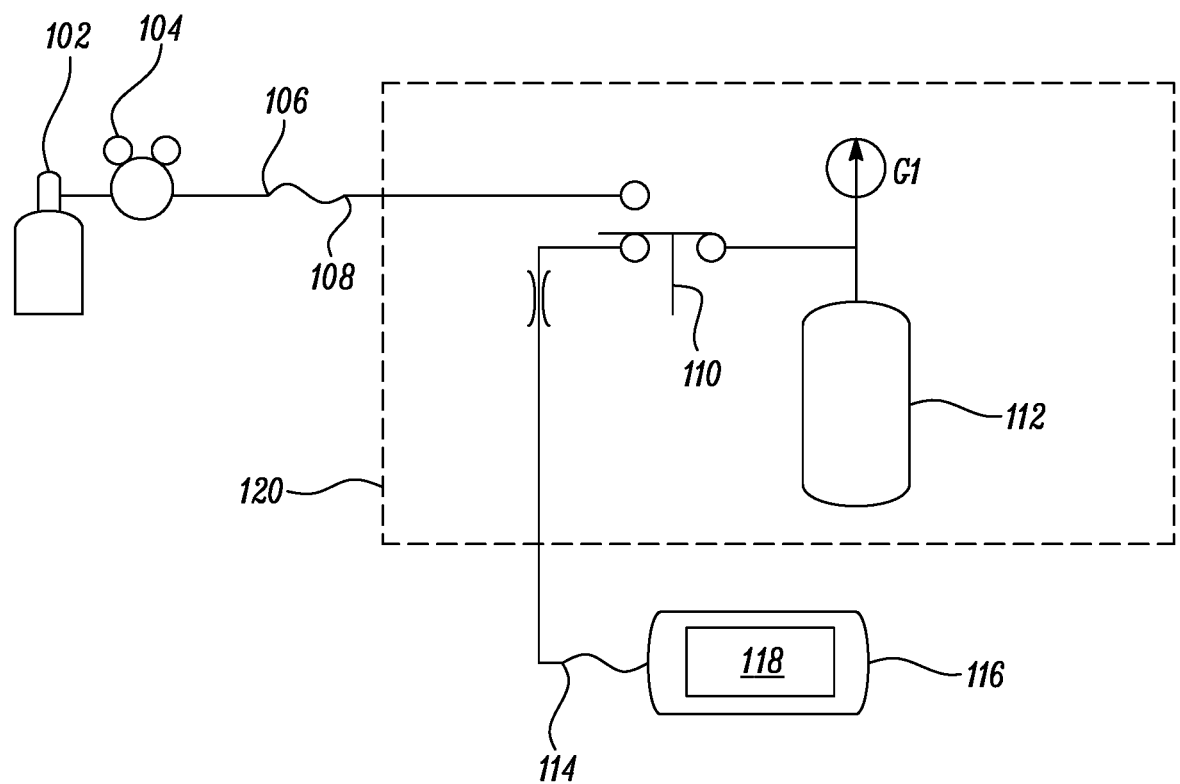
FIG. 1 is a diagram illustrating a gas dosing system, according to an embodiment of the disclosure.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

Embodiments of the disclosure describe the provision of a volume-controlled dose of 87% Xe/13% O2 from a compressed gas cylinder into a barrier film bag, or other customer storage vessel, with a custom inlet connection. The dosing system uses a relationship between pressure and volume to achieve consistent gas dosing.

FIG. 1 is a diagram illustrating a gas dosing system, according to an embodiment of the disclosure. A compressed gas cylinder 102 is a source for providing 87% Xe/13% O2 to a dosing apparatus 120. Although a specific gas mixture is described herein, embodiments of the disclosure are not limited thereto, and any gas may be provided to the system for dosing. The gas mixture is provided from the compressed gas cylinder 102 through a valve integrated pressure regulator (VIPR) 104. Although a VIPR is described, embodiments of the disclosure are not limited thereto, and any mechanism that controls the pressure of the gas mixture to a desired value may be used in the system.

The pressure regulated gas mixture is provided through a VIPR outlet 106 and a connected inlet 108 of the gas dosing apparatus 120. The connection between the VIPR outlet 106 and the inlet 108 may be unique and/or rare in order to prevent connection of an incorrect gas for the intended use of the dosing apparatus 120. The connection between the VIPR outlet 106 and the inlet 108 may also be a quick snap-in connection.

The inlet 108 is connected to a directional control valve 110 of the dosing apparatus 120. The directional control valve 110 is also connected to a fixed volume reservoir 112 of the dosing apparatus 120, and an outlet 114 of the dosing apparatus 120. The directional control valve 110 is a single-action manual valve, that permits flow in either one of two directions, one at a given time. The direction of flow may be changed by depressing an associated button of the dosing apparatus 120, and then changed back by releasing the associated button. While a button is described herein as the controlling mechanism of the dosing apparatus 120, embodiments are not limited thereto, and any manual mechanism that changes the direction of the control valve may be utilized. The directional control valve 110 connects the inlet 108 to the fixed volume reservoir 112 or connects the fixed volume reservoir 112 to the outlet 114.

A resting state of the directional control valve 110 is in an open position connecting the fixed volume reservoir 112 to the outlet 114. When a user depresses the button associated with the directional control valve 110, the directional control valve 110 is transitioned to a closed position. While in the closed position, the directional control valve 110 connects the inlet 108 to the fixed volume reservoir 112, thereby allowing gas flow from the VIPR 104 to the fixed volume reservoir 112 and filling the fixed volume reservoir 112 with the 87% Xe/13% O2 gas mixture from the compressed gas cylinder 102. The fixed volume reservoir 112 is filled with the gas mixture at a consistent pressure.

When the button associated with the directional control valve 110 is released, the directional control valve 110 transitioned to an open position. While in the open position, the directional control valve allows for the transfer of the gas mixture, in a dose volume, from the fixed volume reservoir 112 to the outlet 114 and a connected barrier film bag 116. While a barrier film bag is described herein, embodiments of the disclosure are not limited thereto, and the fixed volume reservoir 112 may be connected to any customer storage vessel that requires controlled and consistent gas dosing. The dosing system uses a relationship between pressure and volume to achieve such gas dosing. The connection between the outlet 114 and the barrier film bag 116 may be a quick snap-in connection, and the system outlet 114 may be customized to mate with a custom inlet connection of the barrier film bag 116. The barrier film bag 116 is illustrated as surrounding a platelet collection bag 118, for example.

The dosing apparatus 120 is manually operated. The operator connects the system outlet 114 to the barrier film bag 116, depresses the manual button of the directional control valve 110 to fill the fixed volume reservoir 112, and releases the manual button to dose the barrier film bag 116 with the gas mixture.

The mechanical system allows for ease of use. Operation of the mechanical system is low cost because it does not require a control system, battery, or power supply. Appropriate dosing is provided with the press and release of a single button associated with the directional control valve 110.

Figure 2:
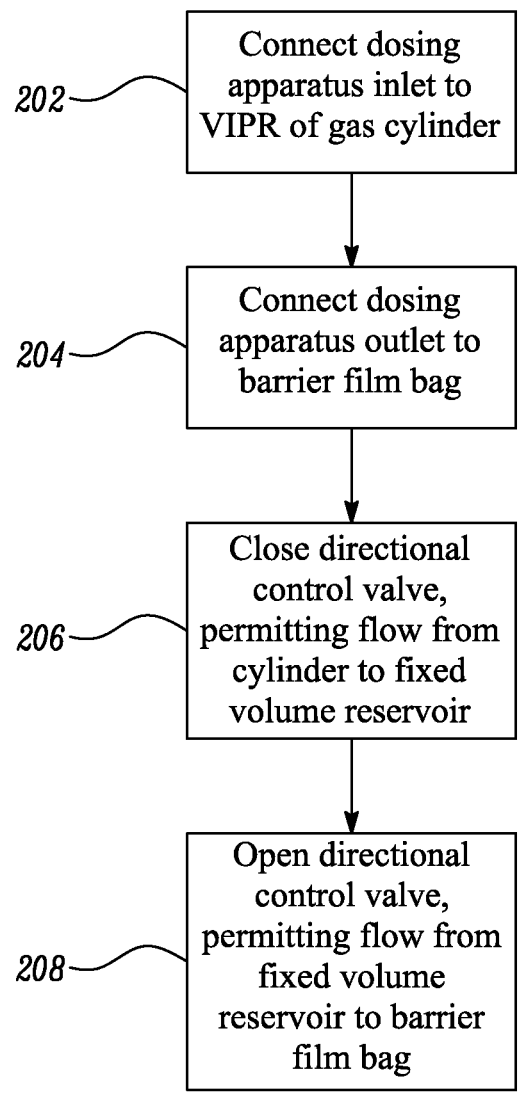
FIG. 2 is a flowchart illustrating a method for operating a gas dosing apparatus, according to another embodiment of the disclosure.

FIG. 2 is a flowchart illustrating operation of a gas dosing apparatus, according to an embodiment. At 202, an inlet of a dosing apparatus is connected to a VIPR of a compressed gas cylinder. At 204, an outlet of the dosing apparatus is connected to a barrier film bag. At 206, a button of the dosing apparatus is depressed, closing a directional control valve of the dosing apparatus and permitting flow of gas from the compressed gas cylinder and VIPR, through the directional control valve, and to a fixed volume reservoir of the dosing apparatus, at a consistent pressure. At 208, the button is released, opening the directional control valve and permitting flow of gas at a dose volume from the fixed volume reservoir, through the directional control valve, and to the barrier film bag.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:
1. A gas dosing system comprising:
   a compressed gas cylinder;
   a valve integrated pressure regulator connected to the compressed gas cylinder and providing gas at a consistent pressure from the compressed gas cylinder;

a directional control valve having a first position and a second position;

a fixed volume reservoir connected to the directional control valve and receiving gas from the valve integrated pressure regulator, via the directional control valve, while the directional control valve is in the first position; and a barrier film bag receiving a gas dose from the fixed volume reservoir, via the directional control valve, while the directional control valve is in the second position;

a first connection between the directional control valve and the valve integrated pressure regulator is a unique snap-in connection; and a second connection between the directional control valve and the barrier film bag is a unique snap in connection.

2. The system of claim 1, wherein the directional control valve is a single action valve that changes from the second position to the first position through manual operation.

3. The system of claim 2, wherein the directional control valve operates in a single direction at a time.

4. The system of claim 2, wherein the manual operation comprises pressing a button associated with the directional control valve.

5. The system of claim 4, wherein the fixed volume reservoir is filled with the gas at a consistent pressure upon pressing the button closing the directional control valve.

6. The system of claim 4, wherein the gas dose is transferred from the fixed volume reservoir to the barrier film bag upon releasing the button opening the directional control valve.

\* \* \* \* \*